No. 781,426. PATENTED JAN. 31, 1905.
E. HOLLINGWORTH.
BEARING FOR CRANKS OR OTHER SHAFTS.
APPLICATION FILED OCT. 1, 1904.
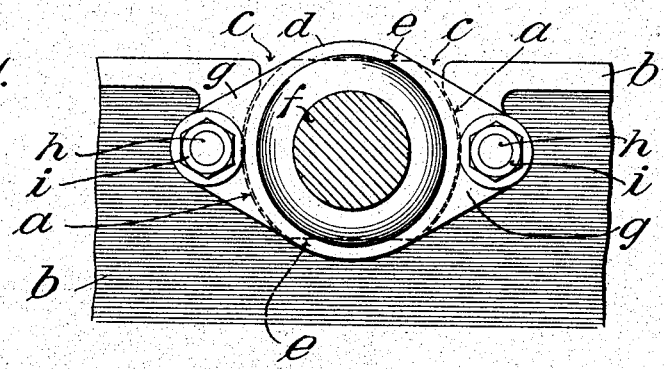
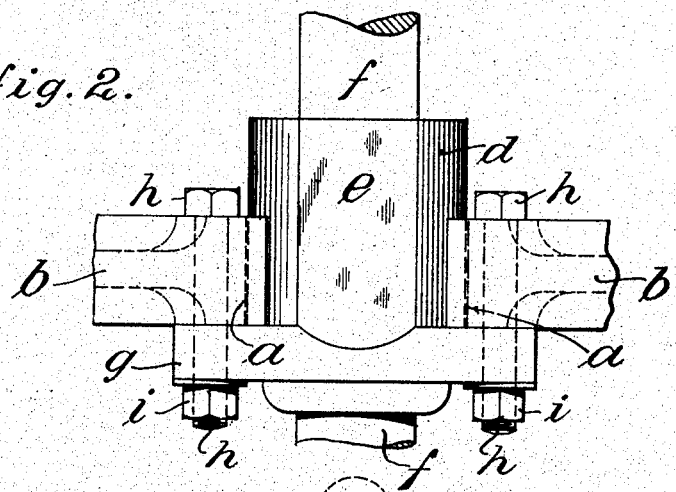
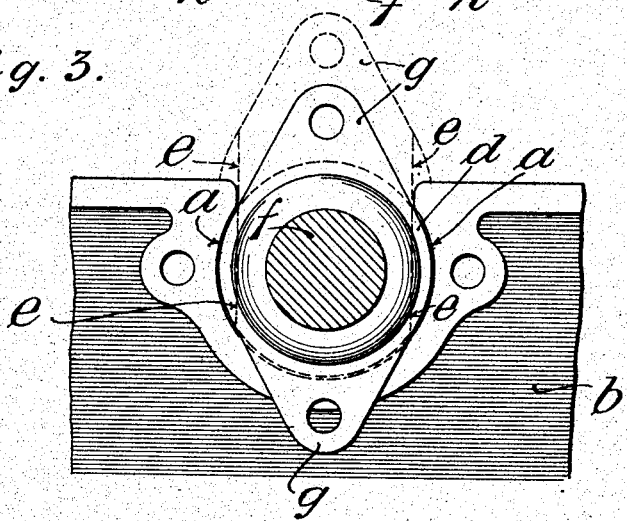
Witnesses.
M Bredt
M. Haas
Inventor.
Edward Hollingworth
By John C. Dewey
Attorney.

No. 781,426. Patented January 31, 1905.

UNITED STATES PATENT OFFICE.

EDWARD HOLLINGWORTH, OF DOBCROSS, ENGLAND, ASSIGNOR TO CROMPTON & KNOWLES LOOM WORKS, A CORPORATION OF MASSACHUSETTS.

BEARING FOR CRANKS OR OTHER SHAFTS.

SPECIFICATION forming part of Letters Patent No. 781,426, dated January 31, 1905.

Application filed October 1, 1904. Serial No. 226,731.

*To all whom it may concern:*

Be it known that I, EDWARD HOLLINGWORTH, a subject of King Edward the VII of England, residing at Dobcross, in the county of York, England, have invented certain new and useful Improvements in Bearings for Cranks or other Shafts, of which the following is a specification.

This invention has reference to bearings for shafts or certain shafts employed in looms and other machines; and the object of my invention is to provide a solid bearing and bush so constructed and arranged that the latter can be accurately and rigidly secured to and in the bearing and disconnected at will to admit of the bush and shaft being raised up clear of the bearing in the framework and removed without disturbing any gears or other parts fast on the shaft, this being of considerable advantage in what may be called a "solid" bearing. In many of the bearings as at present constructed the shaft can only be removed by drawing it longitudinally through the bearing after the gears and other parts have been removed.

In my improved construction of bearing I am also enabled to minimize labor and time occupied in fitting the bearings, the parts fitting truly and accurately together.

Referring to the drawings, Figure 1 is an elevation of bearing and bush for supporting a driven shaft embodying my improvements, the bush being shown secured in proper position. Fig. 2 is a plan view of Fig. 1. Fig. 3 is a similar elevation to Fig. 1, showing the parts in the position occupied when inserting or withdrawing same from the bearing.

In the accompanying drawings, letter *a* designates the bearing which is bored in the framework or bracket *b*, an opening, as *c*, of less width than the diameter of the bearing, being left at the top or upper end of the bearing.

*d* is the bush, which is turned to fit truly in the bearing *a*. The bush *d* has two opposite sides provided with flat portions or surfaces *e e*, which reduce the external diameter of the bush one way—that is, from one flat portion *e* through the bush to the other flat portion *e*—to substantially the same width as the opening *c* at the top of the bearing, so that when turned partly round to present the flat portions *e* at each side thereof, as illustrated in Fig. 3, the bush *d*, with the shaft *f*, can be moved freely in a vertical direction into or withdrawn from the bearing *a*. In Fig. 3 the bush *d* is shown in full lines in position for withdrawal from the bearing or as having just been placed into same and in dotted line partially out of the bearing, as when inserting or withdrawing it therefrom. In the position shown at Fig. 3 the bush and shaft *f* are movable vertically out of the bearing without disturbing any gears or other parts mounted on the shaft. When inserted into the bearing *a*, the bush *d* is given a partial turn to bring the flat portions *e e* thereon to a horizontal position or at top and bottom of the bush, as shown at Fig. 1, the rounded portions of the bush engaging or fitting nicely within the bearing *a* and locking the bush in position.

On the outer end of the bush *d* are flanges or side extensions *g g*, suitably faced to fit accurately and truly against the planed face surrounding the bearing, said flanges or extensions having holes bored therethrough which when the bush is engaged in the bearing coincide with holes in the framework and admit of bolts *h h* being passed through such openings in the framework and into the flanges or extensions and secured by nuts *i i*, whereby the bush is rigidly held in the bearing and a practically solid bearing obtained.

Having thus described my invention, what I claim as new, and desire to secure by Letters Patent, is—

1. The combination with a frame or supporting-bracket, having a bearing-socket formed therein, with an opening of less width than the diameter of said socket, of a bush in which a shaft is adapted to be journaled, said bush having flat portions on opposite sides thereof to reduce its diameter, and adapt it to be inserted into, or withdrawn from said socket, and having a flange or flanges thereon, and means for securing the bush in position, substantially as shown and described.

2. A supporting frame or bracket having a bearing-socket formed therein, with an opening of less width than the diameter of said socket, and a bush to fit said socket, having flat portions on opposite sides thereof, to reduce the diameter of said bush, and adapt it to be inserted into, or withdrawn from said socket, and said bush having thereon a lateral flange or flanges, provided with holes adapted to receive bolts to secure the bush rigidly in position, substantially as shown and described.

EDWARD HOLLINGWORTH.

Witnesses:
J. C. Dewey,
M. Haas.